United States Patent Office 3,504,546
Patented Apr. 7, 1970

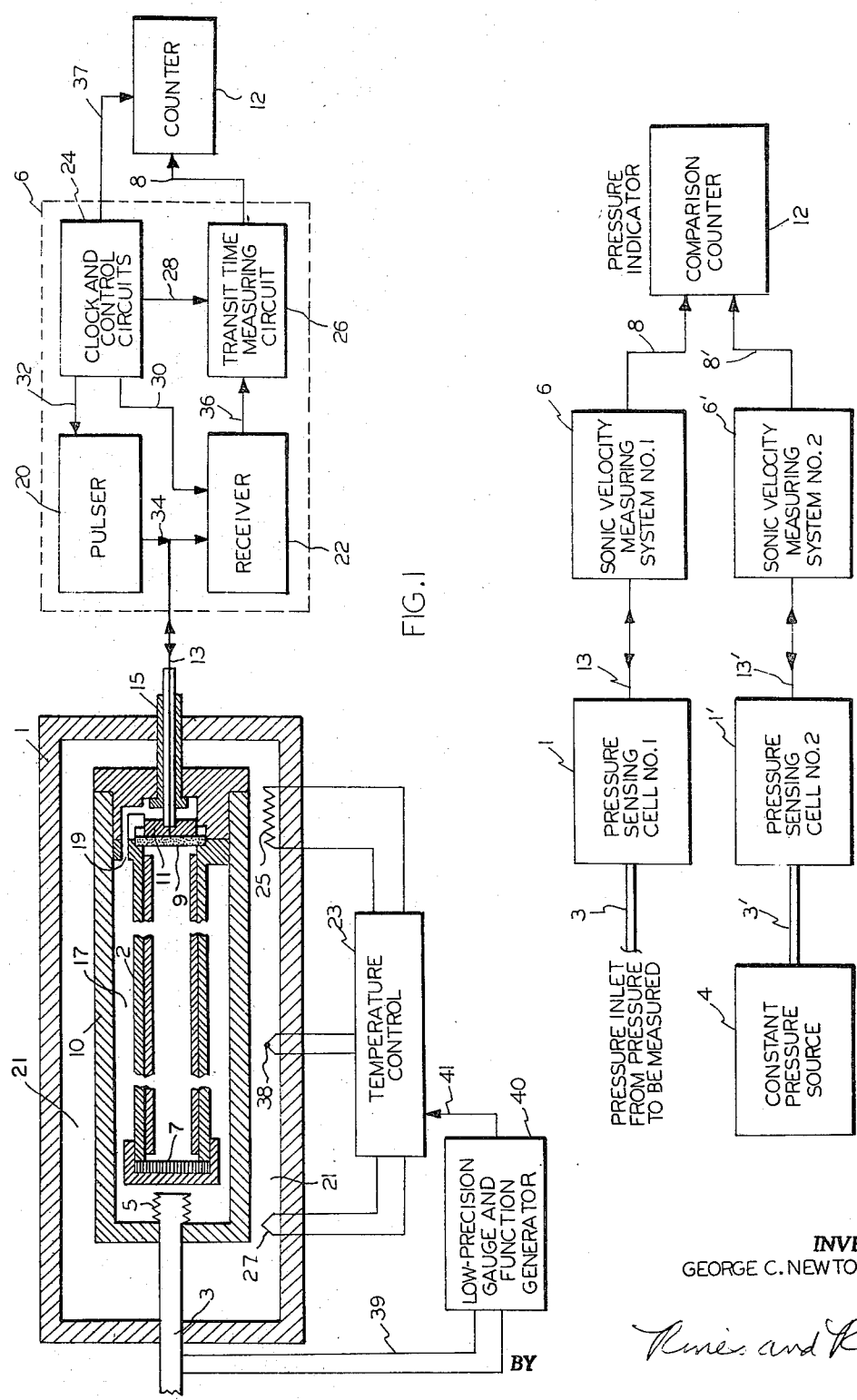

3,504,546
PRESSURE-MEASURING APPARATUS
AND PROCESS
George C. Newton, Jr., Concord Road,
Lincoln, Mass. 01773
Filed Mar. 21, 1968, Ser. No. 715,041
Int. Cl. G01l 11/00
U.S. Cl. 73—388                                   11 Claims

ABSTRACT OF THE DISCLOSURE

A pressure-measuring apparatus and technique is disclosed in accordance with which elastic waves are propagated within a medium, the pressure of which medium is varied in accordance with a pressure-to-be measured, and the pressure-induced change in the velocity of wave propagation in the medium is sensed to provide a measurement of the pressure thereof. The pressure measurement is made substantially independent of temperature by choice of the medium and/or compensation or thermostating.

---

The present invention relates to methods of and apparatus for measuring pressure, being more particularly concerned with pressure measurements attained through the measurement of pressure-induced sonic velocity change in liquids or other media.

Numerous types of pressure-sensing apparatus have been evolved throughout the years for determining unknown pressures in various environments and under various conditions. Restricted-range gauges for use over ranges less than 50 pounds per square inch, for example, have included such devices as manometers, altimeters, high precision vacuum gauges and the like. Such restricted-range gauges, are generally based on force measurements through elastic deformation of solids, and such gauges inherently have a fundamental performance limit set by the stress-strain characteristics of solids available for use as sensing elements, including hysteresis effects. Typically, these conventional, restricted-range gauges are characterized by precision figures from over one percent down to one-tenth of one percent of their full-scale pressure limits. Wider range gauges of higher precision are more difficult to provide. For example, dead-weight piston gauges are available that permit higher precision measurements over ranges exceeding 1000 pounds per square inch; but, unfortunately, such devices are difficult to automate and generally require a human operator in constant attendance.

It is, accordingly, an object of the present invention to provide a new and improved pressure-sensing apparatus and process that shall not be subject to the above described disadvantages but that, to the contrary, shall be adapted for wide-range use with precision better than one-tenth of one percent and shall be particularly suited for automated operation.

A further object is to provide a new and improved pressure-measuring apparatus.

In summary, the ends of the invention are attained with the aid of means for propagating elastic waves within an appropriate medium, means for measuring the changes in velocity of the waves thus propagated in order to provide a measurement of the pressure in the medium, means for adjusting the pressure of the medium in accordance with the pressure to be measured, and means for rendering the pressure measurement substantially independent of temperature. Preferred constructional details are hereinafter set forth.

The invention will now be described with reference to the accompanying drawing, FIG. 1 of which illustrates a longitudinal section of the apparatus constructed in accordance with a preferred embodiment of the invention and shown connected with appropriate circuitry for enabling automatic operation; and FIG. 2 is a block diagram of a modification.

A pressure inlet 3 is shown to the left enabling the reception of pressure external to an outer cell housing 1, it being desired to measure such pressure. The pressure in inlet 3 is shown communicating with a bellows 5 disposed within an inner pressure vessel housing 10 containing an appropriate medium 17, such as water or a sensing medium with similar properties. The purpose of the bellows 5 is to isolate the medium 17 from the fluid whose pressure is to be measured; this isolation is necessary to maintain the purity of the medium 17. In the space 21 between the outer housing 1 and the pressure vessel 10, a temperature-controlled medium 21 is provided of any well-known type, for purposes later explained.

Extending longitudinally within the vessel 10 is an acoustic perforated-wall wave guide or tube 2 communicating with the sensing liquid or other medium 17. At the right-hand end of the guide 2, an elastic-wave transducer such as a piezo-crystal 9 is provided, electrically excitable by means of leads 13–15 and supported by an insulating backing 11, to propagate acoustic waves within the sensing liquid or other medium contained by the wave guide 2 in the direction to the left, toward a passive acoustic wave reflecting surface 7 carried at the left-hand end of the guide 2.

Since the pressure inlet 3, and the electrical leads 13–15 are all sealed in the walls of housings 1 and 10, the pressure assumed by the sensing medium 17 will be determined by the bellows 5 which is, in turn, determined by the pressure at inlet 3 that is to be measured. The transducer 9 will thus propagate elastic waves of sonic or ultra-sonic frequency along the interior of the wave guide 2 within the portion of the medium 17 therein and reflect the same from the reflector 7. The elastic waves may be transmitted in pulses, as under the control of a conventional pulser 20, with the reflected signal received by way of conductor 34 in a conventional receiver 32. The pulser 20 and receiver 22 are part of the sonic velocity measuring system 6 which determines the time in which the elastic-wave pulse travels through the medium 17 to the reflector 7 and back to the transducer 9. From changes in this time interval, of course, the changes in the velocity of the elastic-wave pulse in the medium 17, as pressurized by the bellows 5, are determinable.

The specific preferred circuits of the system 6 include a clock and control circuit 24 that produces conventional timing pulses applied at 32 to the pulser 20 in well-known fashion, and serving also as a reference by way of conductors 30 and 28 for enabling the measurement of the time between the transmitted and received pulse, such time interval being electrically indicated by the circuit 26 connected at 36 to the receiver 32 and at 28 to the clock 24. The output is fed to an electronic counter 12 for measuring the time interval between the transmitted and received pulse, by counting clock pulses delivered by conductor 37, and thus provides a measurement of the velocity of the waves in the wave guide 2. Changes in count indicate changes in sonic velocity of medium 17 and correspond to changes in pressure delivered by inlet 3.

Since the velocity of sound in, for example, liquids, depends on pressure, temperature and composition, and in liquids such as water there is a peak or turning point in the velocity versus temperature characteristic, operation in the region of such turning point enables the measurement at 12 to serve as a measurement of the pressure in the medium 17, and thus the pressure at the pressure inlet 3, that is substantially independent of small changes in temperature. That is, a pressure change is sensed through the change in sound velocity that occurs in the medium 17; this presure-induced velocity change is the fundamental physical property of the medium 17 that is used for sensing purposes. In the case of distilled water, for example, such a turning point, at 100 atmospheres, occurs near 76° C. At this temperature and pressure, a pressure sensitivity of 1.31 meters per second per 100 pounds per square inch exists. With apparatus of the above described character using a few millisecond pulse transit interval in a 4-inch wave guide 2, and elastic waves of frequency in the 1 to 10 megahertz range, wide-range pressure measurements up to 2500 pounds per square inch have been readily attained.

In the above embodiment, when the pressure-measuring application requires, conventional temperature-controlling heater elements 25 and thermoelectric cooling elements 27 may be used with conventional controls 23, preferably to maintain the temperature within the housing 1 near the said turning point of the temperature-velocity characteristic of the medium 17. The temperature control 23 uses the difference between the set point 41 and a signal from temperature sensing means 38, such as a thermistor, as an actuating signal for regulating the heating and cooling of medium 17.

In order to further increase the pressure range without requiring impractically narrow tolerance in the temperature control performance, it is often advantageous to cause the set point 41 of the temperature control to be altered in response to gross pressure changes. The reason for this is that, for many choices of the sensing medium 17, the turning point is a function of pressure, generally increasing with increasing pressure in the case of water-based media. The desired set point changes can be produced by the means shown in dashed lines in FIG. 1, comprising a low-precision pressure gauge, of conventional design, and function generator arrangement 40, with its output coupled to the set point 41 of the temperature control 23. The input to the pressure gauge in 40 is obtained from the pressure inlet 3 through conduit 39. Because the turning point of the medium 17 is nonlinearly related to the pressure, the output of the low-precision pressure gauge may be passed through a suitable function generator in 40 in order to properly change the temperature set point 41. This refinement becomes necessary when very large ranges in pressure are being handled, such as several thousand atmospheres. It is not necessary to provide a separate pressure gauge for causing the temperature of medium 17 to track its turning point, and an alternate approach is to use the information from the counter 12 to replace the low precision gauge of 40.

A single reflection in the wave guide 2 or multiple reflections may be employed for determination of the sonic velocity in medium 17. Compensation for temperature-induced and other errors can be obtained by reference or comparison measurements implemented through the use of pluralities of sensing cells 1 and sonic velocity measurement systems 6 of the type shown in FIG. 1. As an illustration, two such systems, 1–6 and 1'–6' are illustrated in FIG. 2, with the pressure inlet 3' of the second pressure sensing cell 1' being connected to a reference or constant pressure source 4. The outputs at 8 and 8' from the reflective sonic velocity measuring systems 6 and 6' may then be indicated in a conventional comparison counter for these purposes.

Further modifications will also occur to those skilled in this art and all such are considered to fall within the spirit and scope of the invention.

What is claimed is:
1. Pressure-measuring apparatus having, in combination, pressure-receiving means, a housing containing a medium adapted to propagate elastic waves therein at a velocity that varies as a function of the pressure and temperature of the medium, means for propagating elastic waves within said medium, means for measuring the velocity of the waves thus propagated to provide a measurement of the pressure in the said medium, and means for connecting the pressure-receiving means with the said housing to adjust the pressure of the said medium in accordance with the received pressure.

2. Apparatus as claimed in claim 1 and in which there is provided means for rendering the said pressure measurement substantially independent of temperature.

3. Apparatus as claimed in claim 2 and in which the rendering means comprises means for maintaining the medium within the housing substantially at a predetermined temperature.

4. Apparatus as claimed in claim 3 and in which the said predetermined temperature lies in the region of the turning-point of the temperature-pressure characteristic of the medium.

5. Apparatus as claimed in claim 4 and in which means is provided for causing the said predetermined temperature to track the turning point as the pressure is varied.

6. Apparatus as claimed in claim 2 and in which there is provided a further similar medium-containing housing of the same temperature as the medium of the first-named housing and having similar vibration-propagating and velocity-measuring means, in which the rendering means comprises means to maintain the medium in said further housing at a substantially constant pressure to obtain a reference measurement therefrom for correcting the velocity measurement in the first-named housing medium for temperature and other variations therein.

7. Apparatus as claimed in claim 1 and in which the propagating means comprises means for transmitting pulses of acoustic energy and the measuring means comprises means for measuring the transit time of said pulses.

8. Apparatus as claimed in claim 7 and in which the transmitting and measuring means comprise a sound-echoing system wherein the pulses are reflected over a predetermined path within the medium.

9. A process for measuring pressure, that comprises, receiving pressure to be measured, propagating elastic waves within a medium, varying the pressure of the medium in accordance with the received pressure, measuring the velocity of the wave propagation within the medium to provide a measurement of the received pressure, and rendering said pressure measurement substantially independent of temperature.

10. A process as claimed in claim 9 and in which the said rendering step comprises maintaining the said medium at a predetermined temperature.

11. A process as claimed in claim 10 and in which the said predetermined temperature is adjusted to a value near the turning point of the temperature-pressure characteristic of the medium.

References Cited

UNITED STATES PATENTS 3,008,332  11/1961  Charbonnier et al. _ 73—290 XR
3,327,806   6/1967  Anderson _____ 73—67.5 XR DONALD O. WOODIEL, Primary Examiner